United States Patent
Pierart

[15] 3,680,584
[45] Aug. 1, 1972

[54] WELDING CONSTRUCTION FOR MULTILAYERED DEVICES

[72] Inventor: Robert Pierart, Saint-Nazaire, France

[73] Assignee: Babcock-Atlantique, Paris, France

[22] Filed: Feb. 22, 1971

[21] Appl. No.: 117,624

[52] U.S. Cl. .................138/143, 138/142, 29/471.1, 29/471.7
[51] Int. Cl. ..............................................F16l 9/14
[58] Field of Search ....138/137, 142, 143; 137/1, 13; 29/471.1, 471.7; 220/3

[56] References Cited

UNITED STATES PATENTS 2,489,802   11/1949   Needham.....................29/471.1
3,497,101   2/1970   Sagara et al. ......................220/3
3,557,839   1/1971   Uto et al. .......................138/143

Primary Examiner—M. Cary Nelson
Assistant Examiner—David R. Matthews
Attorney—Young & Thompson

[57] ABSTRACT

A welding construction for multi-layered device includes a plurality of concentric superposed tubes tightly fitted within one another and secured to one another by welding at the end of their interfaces formed between adjacent superposed tubes. A space is left between such welds and their associated interface in order to prevent stress concentrations and avoid cracking. Lengths of tubing thus formed are then assembled end to end by welding opposed end portions to each other. Welding in two steps enables the checking after each step.

11 Claims, 5 Drawing Figures

INVENTOR
ROBERT PIÉRART
BY Young + Thompson
ATTYS.

WELDING CONSTRUCTION FOR MULTILAYERED DEVICES

BACKGROUND OF THE INVENTION

1. Field of the Invention

The present invention relates to the construction of a multilayered device comprising a thick-walled metal casing formed of a plurality of superposed layers as well as such a device.

2. Description of the Prior Art

One such known method of construction consists in welding lengths of thick-walled tubing end to end, the lengths being formed by nesting a plurality of thin walled tubes within one another. These tubes are held tight within one another by heating and expanding each tube intended to surround an inner adjacent tube and allowing it to cool and shrink on the latter. The multilayered lengths thus formed are machined at their ends on a lathe as if they were thick-walled ordinary tubing and are then joined end to end by welding.

In Such a method of construction the faces which are to be welded have continuous lines of separation which correspond to the interfaces between superposed layers. These lines constitute notches having virtually no width. However experience has shown that after machining the edges of the lengths of tubing these notches may have a width exceeding 1mm without being in themselves detrimental to the quality of the device.

In the known methods of manufacture automatic welding with a Union Melt powder flux is ordinarily used in order to insure a homogeneous and continuous joining between the opposed edges of adjacent lengths.

These known methods of construction are well adapted to devices which work at moderate temperatures and do not use high-tensile steels which are susceptible to cracking, as has been found in a great number of apparatuses thus constructed which have been functioning for many years.

With respect to devices which are to operate at high temperatures causing high thermal stresses or which use high-tensile steel in conjunction with known welding methods, the multi-layered device could cause serious disadvantages as will be set forth hereinbelow.

In known welding methods, the welding operation is effected by the successive deposit from one side to the other of the space between the opposed edges of adjacent lengths. It is clear that during this welding operation two results must be achieved:

1. the connection between the superposed layers of each length, and
2. the joining of adjacent lengths of multilayered tubes.

The checking of the connection between adjacent layers can be carried out only after the welding operation is finished; such a checking operation is also difficult to effectuate. Repairing the weld is a very delicate operation and involves new risks of faults or cracks. Checking by ultra-sonic methods is equally difficult.

Experience has shown that in the course of such welding the level and the penetration of the different passes or deposits relative to the position of the interfaces can not be determined with sufficient precision.

There prevail in such welding three principal types of dispositions of the weld relative to the interfaces at the edges of the opposed lengths, in particular at the so-called notches:

In a first type, the metal deposited during a welding pass is more or less centered on a notch. A dendritic formation appears in the molten metal as it freezes solid, with the dendrites starting to form at the cold end face of the composite tubing, perpendicular to that face. The interface, which is a "crack" of virtually no width, tends to propagate as a real crack in the solid weld, between dendrites.

In a second type, the metal deposited during one welding pass is off center relatively to the notch, and has a corresponding narrow section opposite the notch, which fact increases the risk of a crack developing between dendrites.

In a third type, the notch is relatively wide and the molten metal penetrates up to a point between adjacent layers of tubing. The metal which has frozen solid between adjacent tube faces forms cusps with these faces and cracks tend to develop at the cusps.

SUMMARY OF THE INVENTION

The object of the present invention is to overcome the aforesaid disadvantages by providing a practical solution to the welding problem of multi-layered pressure devices in particular when these devices are of great dimensions and formed of a high strength steel.

One aspect of the invention consists in a method of welding construction for a device including at least two lengths of tubing extending end to end, each length of tubing being formed as a plurality of superposed tubes tightly fitting within one another and interfaces existing therebetween, comprising the following consecutive steps:

a. welding the end portions of adjacent superposed tubes of each of said lengths of tubing to each other; and b. subsequently welding the lengths of tubing thus formed end to end.

Another aspect of the invention consists in a method of welding construction for a plurality of superposed elements, interfaces being formed between adjacent superposed elements, the steps comprising : welding the ends of adjacent superposed elements to one another in the vicinity of their associated interfaces and effecting a cavity between each such weld and its associated interface.

These methods enable the elimination of such notches and cusps at the edges of the lengths in contact with the weld which as shown above cause faults and cracks.

A further aspect of the invention consists in a device comprising at least two lengths of tubing, each length of tubing including a plurality of superposed tubes tightly fitting within one another, interfaces existing between each pair of adjacent superposed tubes, a plurality of grooves disposed at the end portions of the lengths of tubing and generally along the interfaces, adjacent superposed tubes of each length being secured to one another by first welds provided in said grooves, and the tubes extending end to end and joined together by a second weld effected therebetween and independent of said first welds.

Further objects, features and advantages of the invention will be further brought out in the description

DESCRIPTION OF A PREFERRED EMBODIMENT

Figure 1:
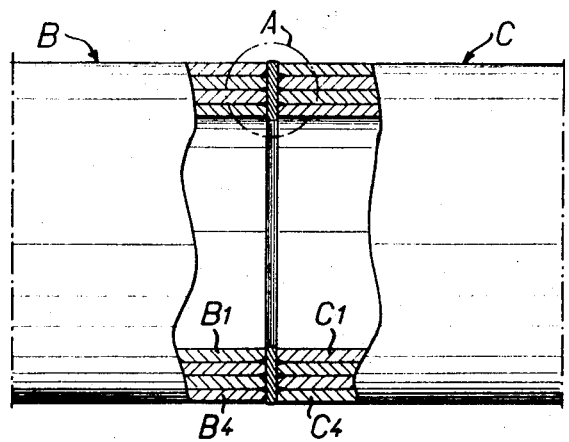
FIG. 1 shows two lengths of tubing placed end to end used for producing a multi-layer device according to the invention.
Figure 2:
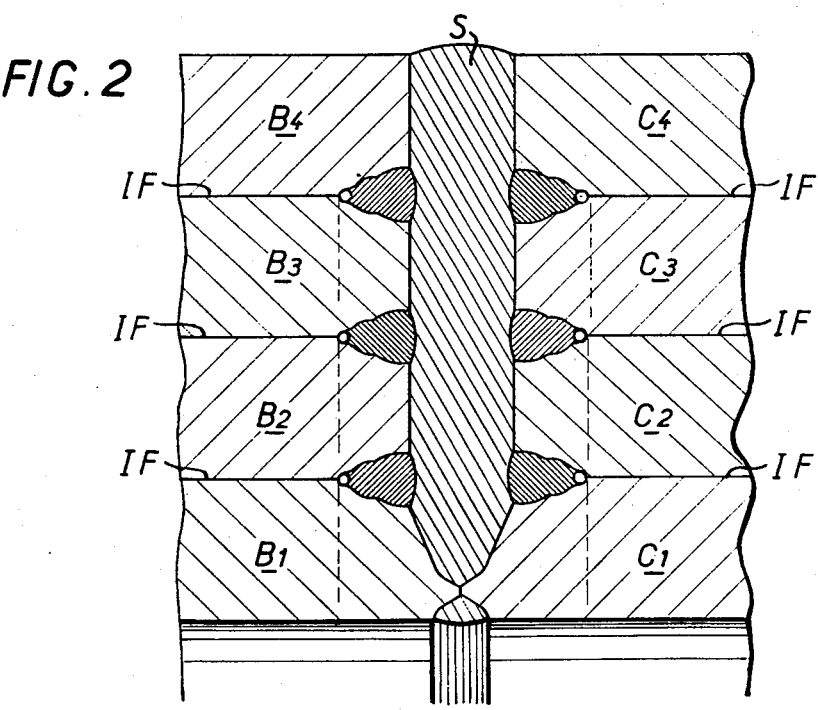
FIG. 2 shows the detail A for FIG. 1 on a larger scale.

The device to be constructed is formed by welding two lengths of tubing, for example lengths B and C of FIG. 1, end to end. Each one of these lengths comprises four thin tubes designated respectively $B_1$, $B_2$, $B_3$, $B_4$ and $C_1$, $C_2$, $C_3$, $C_4$. The tubes forming each such length are nested tightly within one another by heating accompanied by expansion and contraction following cooling, in a manner known per se. The interface IF between such tubes are shown in the detail of FIG. 2.

Figure 3:
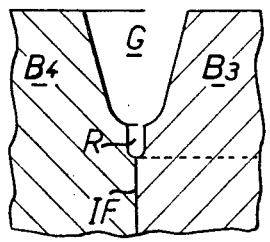
FIGS. 3-5 show three successive steps in the welding of two superposed thin tubes of a length of such tubing.

Once such a length of tubing is constructed, the end faces thereof are machined for example with a lathe. This machining comprises forming a substantially V-shaped groove G rounded at its inner end and centered about its associated interface at the edges of the interfaces between each adjacent pair of superposed tubes. One such groove G corresponding to the interface IF between the thin tubes $B_3$ and $B_4$ is shown in FIG. 3.

Figure 4:
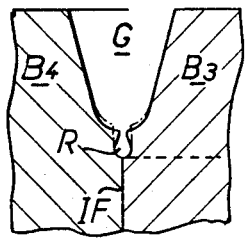

A relatively narrow secondary groove R is formed at the inner end of each of the grooves G. The passage communicating between the groove G and the secondary groove R is limited or constrained by the swaging of the metal by a pneumatic tool or the like in order to obtain the deformed position shown in solid lines in FIG. 4, the original condition being shown in chain-dotted lines in this figure.

The groove R thus deformed can then be filled with a powdery flux, though this is not indispensable. A welding fillet is then effected in each one of the grooves G.

Figure 5:
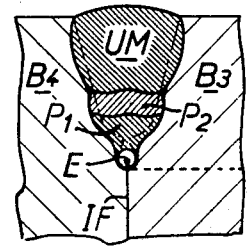

This welding fillet shown in FIG. 5 is effected flatwise. Such lengths of tubing are placed on a turntable having a variable speed control, the axis of the length being arranged perpendicular to the plane of the turntable.

The weld is centered about its associated interface ; the following steps are carried out:

1. Welding at the inner end of the groove G, effected in two steps or passes $P_1$, $P_2$ by means of a manually operated arc-welder with basic electrodes which have a high resistance to cracking;

2. Checking of this weld by magnetoscope in order to verify the absence of cracking;

3. Union Melt filling of the groove by automatic welding with a Union Melt flux to the outer edge of the tube, using as welding material wire of suitable grade appropriate to the grade of the tube plates material;

4. Ultra-sonic checking of all the welds between super-posed layers.

The narrow groove R which may be filled with a powdered flux, and which is constricted at its opened or outer end by swaging remains free of filled metal and forms a gap between the welding fillet and the associated interface IF. The notch E situated at the end of the interface IF is therefore not in contact with the weld and does not risk causing a crack therein. Thus the "crack" existing at the interface IF is prevented from propagating into the welding fillet.

The welding of opposed lengths B, C end to end is carried out in a manner known per se by means of a main weld S (FIG. 2).

The method described hereinabove provide certains advantages over known methods. In particular, the welding of the superposed layers of tubes for a length of tubing is formed independently of the welding of adjacent lengths end to end and therefore can be carried out under the best conditions of manufacture and control.

Further the welding between the thin tubes is carried out under favorable conditions, with the end face of the composite tubing disposed flat and fully accessible, while in known methods the weld which connects the thin tubes together must be deposited in a relatively narrow space between opposite end faces of successive lengths of tubing.

The groove R and therefore the welds between the tubes or layers are always centered about their respective interface IF. Basic electrodes having an elevated resilience and a high resistance to cracking can be used for the interface weld.

There is no longer a risk of cracking nor of starting a crack in the weld owing to the special shape of the groove G and the presence of the empty cavity at the closed or inner end of groove G. The main weld S between the opposed lengths is also out of contact with the notch E.

The checking is extremely easy and accurate and possible repairs do not create any difficulties. The main weld between lengths of multi-layered tubes is only undertaken after the checking of the welds between each superposed pair of tubes has been carried out.

When the device is operating for instance as a container of hot fluid, thermal stresses occur because the temperature gradient across the main weld S is not the same as across the superposed metal layers $B_1$ through $B_4$ and $C_1$ through $C_4$. These thermal stresses include shear stresses at the interfaces IF, and resistance to such shear stresses is increased by the metal filling in grooves G.

The invention is of course not limited to the embodiment illustrated and described herein but extends to all variations, alternatives and equivalents within the scope of the appended claims. Accordingly, the arrangement of a cavity forming the gap between the two layers of superposed tubes and the weld maintaining these layers in position is applicable in a general manner to multilayered welded construction of any type.

It is also noted with respect of the terminology used in the description and in the appended claims, the term "length" and "tube" are not limited to cylindrical elements with circular cross-sections and that the invention is not limited to multi-walled structures formed as surfaces of revolution nor to such structures having a uniform shape in transverse section.

What I claim is:

1. A method of welding construction for a device including at least two lengths of tubing extending end to end, each length of tubing being formed as a plurality of superposed tubes tightly fitting within one another and interfaces existing therebetween, comprising the following consecutive steps:
  a. welding the end portions of adjacent superposed tubes of each of said lengths of tubing to each other; and
  b. subsequently welding the lengths of tubing thus formed end to end.

2. A method according to claim 1, further comprising forming a cavity between interfaces and the welds joining their associated pairs of adjacent superposed tubes.

3. A method according to claim 1, further comprising forming a first plurality of grooves at said end portions and generally centered along the interface disposed between the adjacent pairs of superposed tubes.

4. A method according to claim 3, further comprising forming a second plurality of narrow grooves at the inner or closed ends of the first plurality grooves, the narrow grooves thereby providing cavities between their associated interface and the welds joining their associated adjacent superposed tubes.

5. A method according to claim 4, further comprising shaping the ends of the narrow grooves adjacent to their associated groove for constraining the passage therebetween and thereby preventing the flow of metal into the narrow grooves during welding.

6. A method according to claim 4, further comprising filling each of said narrow grooves with a powdered flux before welding its associated pair of adjacent superposed tubes.

7. A method according to claim 3, further comprising effecting the welding of adjacent superposed tubes in two stages: (a) arc welding with basic electrodes having high resistance to cracking, and (b) filling the rest of the groove by automatic welding with a flux.

8. A method according to claim 7, further comprising checking the first stage of the weld with a magnetoscope before carrying out the second stage, and ultra-sonically checking the second stage of welding before assembling the lengths of tubing end to end.

9. A method according to claim 1, wherein the welding of the end portions of adjacent superposed tubes is effected by flat welding.

10. A method of welding construction for a plurality of superposed elements, interfaces being formed between adjacent superposed elements, the steps comprising; welding the ends of adjacent superposed elements to one another in the vicinity of their associated interfaces and effecting a cavity between each such weld and its associated interface.

11. A device comprising at least two lengths of tubing, each length of tubing including a plurality of superposed tubes tightly fitting within one another, interfaces existing between each pair of adjacent superposed tubes, a plurality of grooves disposed at the end portions of the lengths of tubing and generally along the interfaces, adjacent superposed tubes of each length being secured to one another by first welds provided in said grooves, and the tubes extending end to end joined together by a second weld effected therebetween and independent of said first welds.

* * * * *